United States Patent
Handley et al.

(10) Patent No.: US 8,234,138 B2
(45) Date of Patent: Jul. 31, 2012

(54) METHOD AND SYSTEM TO ASSOCIATE DEVICE MODELS AND ACCOUNTS BY UTILIZATION BANDS

(75) Inventors: John C. Handley, Fairport, NY (US); Jeffrey R. Earl, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 395 days.

(21) Appl. No.: 12/574,898

(22) Filed: Oct. 7, 2009

(65) Prior Publication Data

US 2011/0082722 A1 Apr. 7, 2011

(51) Int. Cl.
- G06Q 10/00 (2012.01)
- A01K 5/02 (2006.01)
- G06F 17/50 (2006.01)
- G06F 7/04 (2006.01)
- G06F 15/16 (2006.01)
- G06F 17/30 (2006.01)
- G06F 11/30 (2006.01)
- H04L 29/06 (2006.01)
- G03G 15/00 (2006.01)
- G21C 17/00 (2006.01)

(52) U.S. Cl. ............. 705/7.11; 705/7.12; 705/7.22; 705/29; 705/412; 726/7; 399/9; 702/184

(58) Field of Classification Search ............... None
See application file for complete search history.

(56) References Cited

U.S. PATENT DOCUMENTS

| | | | | |
|---|---|---|---|---|
| 7,127,433 | B2 * | 10/2006 | Baker | 705/400 |
| 7,567,946 | B2 | 7/2009 | Andreoli et al. | |
| 7,929,165 | B2 * | 4/2011 | Bressan et al. | 358/1.15 |
| 2003/0128991 | A1 * | 7/2003 | Carling et al. | 399/8 |
| 2004/0078425 | A1 * | 4/2004 | Sandfort et al. | 709/203 |
| 2004/0138945 | A1 * | 7/2004 | Adkins et al. | 705/14 |
| 2004/0215468 | A1 * | 10/2004 | Doeberl et al. | 705/1 |
| 2008/0097821 | A1 * | 4/2008 | Chickering et al. | 705/10 |
| 2008/0215411 | A1 * | 9/2008 | Hu et al. | 705/8 |
| 2008/0243606 | A1 * | 10/2008 | Snyder et al. | 705/14 |
| 2008/0243817 | A1 * | 10/2008 | Chan et al. | 707/5 |
| 2010/0192212 | A1 * | 7/2010 | Raleigh | 726/7 |

OTHER PUBLICATIONS

E. Gaussier et al. "A Hierarchical Model for Clustering and Categorising Documents", Xerox Research Center Europe.
Thomas Hofmann, "Unsupervised Learning by Probabilistic Latent Semantic Analysis", Machine Learning, 2001, pp. 177-196, vol. 42, Kluwer Academic Publishers, Netherland.
Thomas Hofmann et al., "Unsupervised Learning from Dyadic Data", International Computer Science Institute, 1998, pp. 1-33, Berkeley, California.
Thomas Hofmann et al., "Probalistic Latent Semantic Indexing", International Computer Science Institute, Proceeding of the Twenty-Second Annual International SIGIR Conference on Research and Development in Information Retrieval.

* cited by examiner

Primary Examiner — Lynda Jasmin
Assistant Examiner — Sujay Koneru
(74) Attorney, Agent, or Firm — Fox Rothschild LLP

(57) ABSTRACT

Methods and systems for identifying devices having a specified utilization are disclosed. A selected minimum utilization and maximum utilization defining a utilization band may be received. Device information for each of a plurality of accounts, including a device model and utilization information for each device associated with an account, may also be received. A utilization may be determined for each device based on the utilization information. For each device model in an account, a number of devices in an account having the device model and a utilization in the utilization band may be determined. A plurality of clusters may be identified for device model-account pairs, and at least one device model-account pair may be assigned to a cluster.

17 Claims, 3 Drawing Sheets

METHOD AND SYSTEM TO ASSOCIATE DEVICE MODELS AND ACCOUNTS BY UTILIZATION BANDS

BACKGROUND

The present disclosure generally relates to the fields of data measurement and improving device utilization. More specifically, the present disclosure relates to methods and systems for associating device models and accounts by utilization bands to identify devices that should be upgraded or modified in accounts.

A managed print service often includes operations that are managed by a second party on behalf of an enterprise. As a form of outsourcing, it allows the enterprise to focus on its core business while enabling the printing assets of an enterprise to receive improved service at reduced cost.

Account managers for a managed print service seek to identify additional opportunities to reduce costs for their managed accounts. One way for account managers to reduce cost is by identifying equipment that properly meets the printing requirements for a particular account. For example, printing devices of a particular model may be underutilized in an account. In such cases, reducing the number of printing devices of that particular model or replacing such printing devices with alternate printing devices may reduce the overall cost for the account. Conversely, if printing devices of a particular model are highly utilized in an account, such printing devices could present a greater risk of breaking down and/or could be too slow for the needs of its users. Such devices could be replaced with one or more higher-volume printing devices.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "device" is a reference to one or more devices and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

In an embodiment, a system for identifying devices having a utilization within a utilization band may include a processor and a processor-readable memory in operable communication with the processor. The processor-readable memory may contain one or more programming instructions for receiving a selection for a utilization band including a minimum utilization and a maximum utilization, receiving device information for each of a plurality of accounts, where the device information for each account comprises a device model and utilization information for each device associated with the account, determining a utilization for each device based on the utilization information, determining, for each device model in each account, a number of devices in the account having the device model and for which the utilization is in the utilization band, identifying a plurality of clusters for device model-account pairs, where each combination of device model and account comprises a device model-account pair, and assigning at least one device model-account pair to a cluster.

In an embodiment, a method of identifying devices having a utilization within a utilization band may include receiving, by a processing device, a selection for a utilization band comprising a minimum utilization and a maximum utilization, receiving, by the processing device, device information for each of a plurality of accounts, where the device information for each account comprises a device model and utilization information for each device associated with the account, determining, for each device model in each account, via the processing device, a number of devices in the account having the device model and a utilization in the utilization band, and identifying, via the processing device, a plurality of clusters for device model-account pairs, where each combination of device model and account comprises a device model-account pair.

In an embodiment, a system for identifying devices having a utilization within a utilization band may include a processor and a processor-readable memory in operable communication with the processor. The processor-readable memory may contain one or more programming instructions for receiving a selection for a utilization band comprising a minimum utilization and a maximum utilization, receiving device information for each of a plurality of accounts, where the device information for each account comprises a device model and a utilization for each device associated with the account, determining, for each device model in each account, a number of devices in the account having the device model and for which the utilization is in the utilization band, identifying a plurality of clusters for device model-account pairs, where each combination of device model and account comprises a device model-account pair, and assigning at least one device model-account pair to a cluster.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
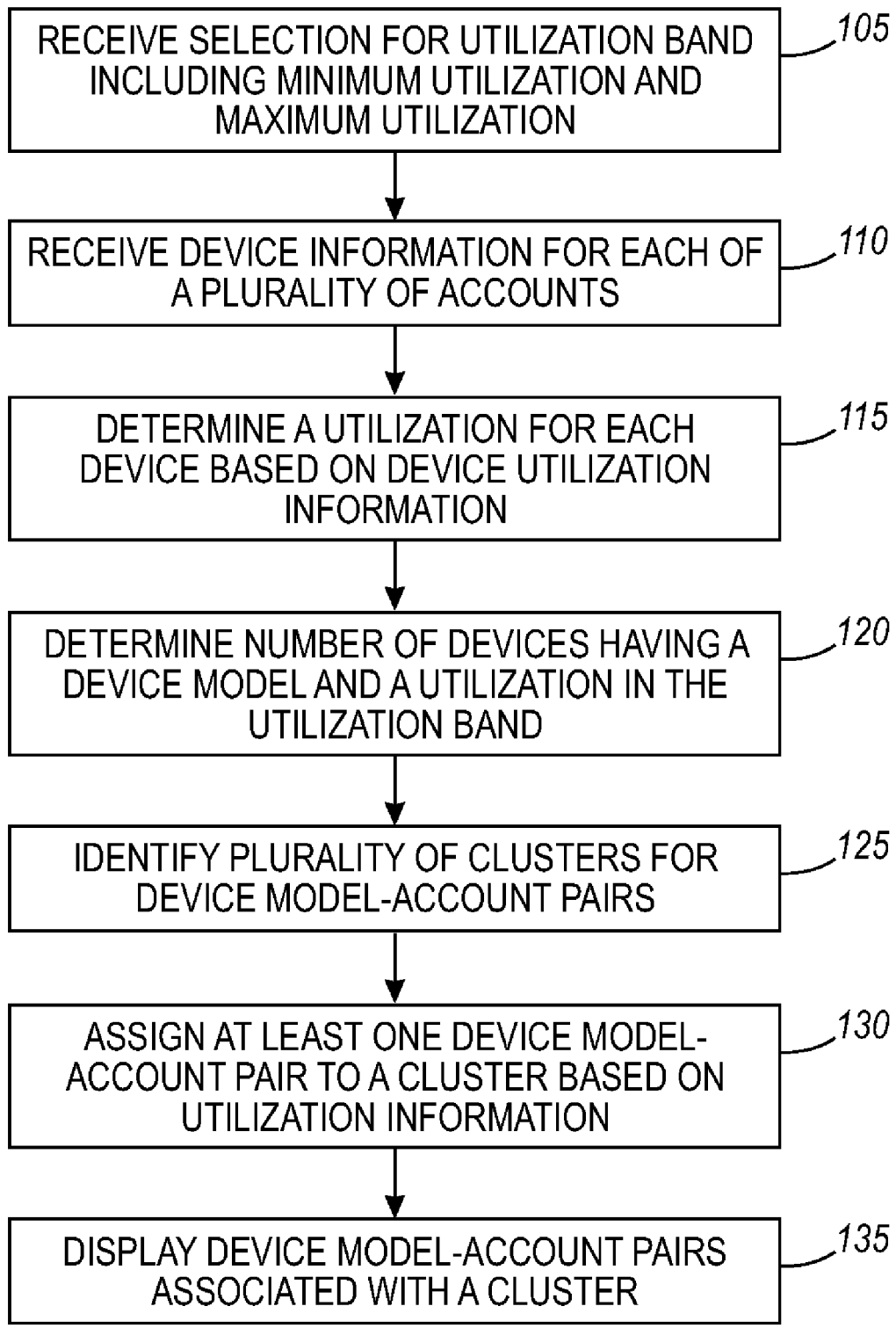
FIG. 1 depicts a flow diagram of an exemplary method for identifying a cluster of devices having a utilization within a utilization band according to an embodiment.

The following terms shall have, for the purposes of this application, the respective meanings set forth below.

A "cluster" is a grouping of related objects or types of objects. A cluster includes one or more objects or types of objects that have one or more similar features or characteristics.

A "device model" is a type of device that can be used in an account. For example, a device model for a printing device may be represented by a manufacturer's name and a designator used to identify the printing device.

A "utilization band" is a range of utilization values. A utilization band may be considered when identifying clusters of model-account pairs.

Utilization of a device may be the average proportion of time that the device is performing a function in a given unit of time, such as a business day. For example, utilization of a printing device may be determined based on the total number of print operations performed by the printing device in a given day (i.e., impression count), the rate at which the printing device prints (e.g., in pages per minute), and the number of minutes in a business day as defined under a service agreement for the account. In particular, utilization may be defined by the following formula:

$$\text{Utilization} = \frac{\text{impression count}}{\text{rate} * \text{time}}.$$

Determining whether a relationship exists between the utilization of one or more device models across a plurality of accounts may assist account managers is recommending additional or alternate devices for an account. For example, if devices of a particular model are under-utilized in some accounts, a determination may be made as to whether to replace or reduce those devices in those accounts. Alternately, if a preferred utilization band is identified, account managers may wish to know which device models fall within that range across a plurality of accounts.

Various methods of analyzing accounts may be performed. In an embodiment, each account may be analyzed separately by examining the distributions of the utilization of each device model within the account. For each device model, an assessment could be made based on the number of devices of such model that fall within a particular utilization band. Models having high counts in a given utilization band could be classified as models exemplifying that range. In an alternate embodiment, a plurality of accounts having a particular device model could be examined, and the number of devices in an identified utilization band could be tallied. Combining the two approaches by looking at device counts in a utilization band for each device model and account combination can be performed as well.

However, a more complete approach includes analyzing counts of devices within a utilization band to identify clusters of model-device combinations across accounts. More than simply utilizing raw counts, such an analysis enables the statistical estimation of clusters using a probability model. Clustering on two attributes simultaneously may be referred to as co-clustering. An exemplary method of co-clustering includes probabilistic latent semantic analysis (PLSA). Applying a co-clustering algorithm results in clusters of models and accounts that have been determined to be statistically meaningful. The clusters may be analyzed for indications that certain models in certain accounts statistically lie within a utilization band.

FIG. 1 depicts a flow diagram of an exemplary method for identifying a cluster of devices having a utilization within a utilization band according to an embodiment. As shown in FIG. 1, a selection for a utilization band, including a minimum utilization and a maximum utilization, may be received 105. The minimum utilization and maximum utilization may denote a range of utilizations for devices, such as printing devices, of interest to, for example, an account manager.

Device information for each of a plurality of accounts may also be received 110. The device information for each account may include a device model and utilization information for each device associated with the account. The utilization information for a device may include information pertaining to utilization of the device over one or more time periods. In an embodiment, the utilization information for a device may include a device utilization over a particular day, week, month, year or the like. For example, a device that printed 6000 pages in a 9-hour workday and operated at a rate of 60 pages per minute may have a device utilization of $$\frac{6000 \text{ pages/day}}{(60 \text{ ppm})(540 \text{ min/day})} = 11.1\%.$$

In an alternate embodiment, the utilization information for a device may include device utilizations for a plurality of time periods (such as each hour in a day, each day in a week, or the like).

A utilization for each device may be determined 115 based on the utilization information. For example, if the utilization information includes device utilizations for a plurality of time periods, a statistical likelihood of the device being within a particular utilization band may be determined. In such an embodiment, the utilization may be determined 115 based on the statistical likelihood.

The number of devices in each account having the same device model and a utilization in the utilization band may be determined 120. Alternately or additionally, a percentage of all devices of a particular device model that have a utilization in the utilization band may be determined 120. Other methods for assigning a utilization to a device model, such as identifying a median utilization, a mean utilization, or the like, may be performed within the scope of this disclosure. Each combination of device model and account may identify a device model-account pair.

A plurality of clusters for the device model-account pairs may then be identified 125. If PLSA is used as the co-clustering technique, a number of clusters K can be identified 125 by determining the number of clusters that has the minimum value for a penalized likelihood function; such as the Bayesian Information Criterion (BIC). Maximum likelihood estimates of conditional probabilities are computed using an expectation maximization algorithm.

In an embodiment, the plurality of clusters for the device model-account pairs may be identified 125 by, for each of a plurality of numbers of clusters (i.e., for a first number of clusters, a second number of clusters, etc.), determining a probability that each device model-account pair occurs, determining a maximum log likelihood value equal to the sum, over all device model-account pairs, of the product of the number of devices in a device model-account pair having the device model and for which the utilization is in the utilization band and the log of the probability that the device model-account pair occurs, and determining a penalized likelihood value based on at least the number of clusters and the maximum log likelihood value for the number of clusters. In an embodiment, the probability that each device model-account pair occurs is based on the likelihood that a device in the account having the device model has a utilization within the utilization band. For example, the probability may be based on (i) the number of devices having the device model and having a utilization within the utilization band, and (ii) the total number of devices having the device model. Other statistical measures may also be used within the scope of this disclosure.

Exemplary penalized likelihood functions used to determine penalized likelihood values may include the Bayes Information Criterion (BIC=K log|X|−2$l_{mle}$(K), where |X| is the sum of the number of devices in each device model-account pair having the device model and for which the utilization is in the utilization band) or Akaike's Information Criterion (AIC=2K−2$l_{mle}$(K)). Other penalized likelihood values may also be used within the scope of this disclosure. Penalized likelihood functions are used to balance the goodness of fit as measured by the maximum log likelihood value $l_{mle}$ with the number of parameters used to make the fit. A number of clusters corresponding to the smallest penalized likelihood value may then be selected.

At least one device model-account pair may then be assigned 130 to a cluster based on its utilization information. In an embodiment, a probability of assigning 130 a device model-account pair to a cluster may be determined for each cluster. In an alternate embodiment, a probability of assigning 130 a device model-account pair to a cluster may be determined for each cluster with which the device model-account pair is associated.

The device model-account pair may be assigned 130 to the cluster associated with the highest probability. In an alternate embodiment, the device model-account pair may be assigned 130 to a cluster associated with the highest probability in response to the probability surpassing a threshold.

In an embodiment, a probability of assigning 130 a device model-account pair to a particular cluster may be used to assess confidence in the cluster. For example, if each of the device model-account pairs assigned to a cluster has a high probability of being assigned to such cluster, confidence that the cluster is properly formed may be higher than if each of the device model-account pairs assigned to a cluster has a relatively lower probability of being assigned to such cluster.

The device model-account pairs associated with the cluster may then be displayed 135 to an account manager or other user. Displaying the device model-account pairs may enable the account manager to identify devices that are, for example, underutilized in the account, provide general information regarding the underutilization of the devices across a plurality of accounts to a customer, and/or recommend that the customer modify the devices used in the account in some way.

Clusters of device model-account pairs may be displayed 135 to an account manager in an ordered representation. For example, clusters may be ordered based on the device model, the account, or by the assessed confidence in the cluster based on the assignment probabilities of the device models for the cluster. Other methods of ordering the device model-account pairs may also be used within the scope of this disclosure.

An exemplary method for performing a co-clustering technique is described below. X may represent a matrix of counts for the device model-account pairs, which is modeled as the number of occurrences of two jointly distributed random variables S (device models) and T (accounts). The outcome (S=s, T=t) means that device model s and account t occurred together. Count X(s, t) is equal to the number of devices of device model s in account t that have a utilization falling within a utilization band of interest.

A number of clusters K is determined using a co-clustering method, such as PLSA. The co-clustering method may be applied for each of a plurality of numbers of clusters (e.g., one cluster, two clusters, etc.) in order to determine the number of clusters that best fits the data based on the value returned by a penalized likelihood function.

If PLSA is used as the co-clustering method, the probability model used to determine the clusters is P(S=s, T=t)=$\Sigma_a$P(S=s, T=t|A=a)P(A=a). Using this probability model, the outcome (s, t) is based on a number of effects a. Each effect a corresponds to a cluster. The probability model may be rewritten by applying the property of conditional independence in the following form $$P(S=s,T=t)=\Sigma_a P(S=s|A=a)P(T=t|A=a)P(A=a).$$

Using counts X(s, t), a log likelihood function may be determined based on the probability model:

$$l=\Sigma_{s,t}[X(s,t)\log(\Sigma_a P(S=s|A=a)P(T=t|A=a)P(A=a))].$$

If all effects a (i.e., clusters) are assumed to be equiprobable, the parameters of interest for the log likelihood function are P(S=s|A=a) and P(T=t|A=a), which can be estimated using a technique referred to as expectation maximization. The estimation procedure yields a maximum likelihood estimate, $l_{mle}$(K). The number of clusters is determined by the value K that minimizes a penalized likelihood function, such as the BIC or the AIC. As stated above, the BIC function is BIC(K)=K log|X|−2$l_{mle}$(K) and the AIC function is AIC(K)=2K−2$l_{mle}$(K). Accordingly, the maximum likelihood estimate $l_{mle}$(K) is typically determined for a plurality of numbers of clusters in order to determine the number of clusters K that best fits the data by minimizing the penalized likelihood function. Alternate penalized likelihood functions may be used within the scope of this disclosure.

Each device model-account pair (s, t) is assigned to its most probable cluster k based on the following determination: k=arg max P(S=s|A=a)P(T=t|A=a). In one embodiment, a device model-account pair (s, t) is only assigned to a cluster k if the above determination is greater than a threshold. A confidence value p(k) that a device model-account pair (s, t) is correctly assigned to cluster k may be determined using the following formula:

$$p(k)=P(S=s|A=k)P(T=t|A=k).$$

Figure 2:
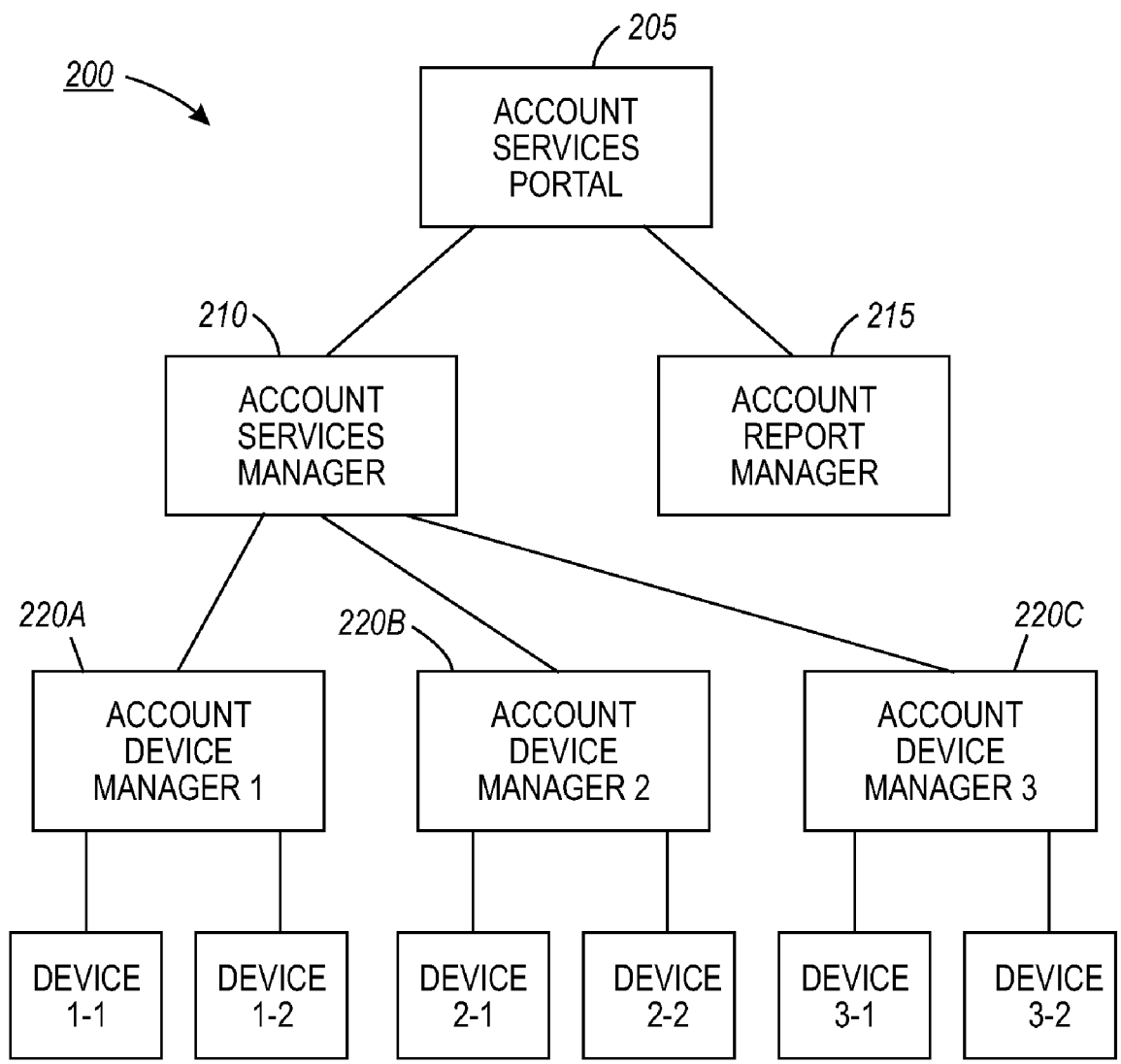
FIG. 2 depicts a block diagram of an exemplary system architecture for managing accounts for which utilizations are identified according to an embodiment.

FIG. 2 depicts a block diagram of an exemplary system architecture for managing accounts for which utilizations are identified according to an embodiment. As shown in FIG. 2, the system 200 includes an account services portal 205, an account services manager 210, an account report manager 215 and an account device manager, such as 220a-c, for each account.

The account services portal 205 may be a customer-facing resource used to submit support the customer accounts. For example, the account services portal 205 may enable a customer to submit information from meters, advise an account manager regarding an incident and/or request additional supplies for the devices within the customer's account. The account services portal 205 may also provide an interface for receiving customer satisfaction surveys or other marketing materials. Customers may also obtain information regarding devices for their account or download updated software drivers via the account service portal 205.

The account services manager 210 may be used to manage and store information pertaining to a plurality of accounts. For example, the account services manager 210 may store information pertaining to devices and supplies used by each account. In addition, the account services manager 210 may record financial information, meter information and/or information pertaining to incidents, such as device failures or other service requests. Performance metrics may also be determined and/or stored by the account services manager 210.

The account report manager 215 may be used to provide reports for one or more accounts to an account manager that manages such accounts. Such reports may include cost, productivity, customer satisfaction, and quality metric information for managed devices within one or more accounts.

Each account device manager, such as 220a, may be used to manager information received from devices in an account. The account device manager 220a may be used to identify, monitor and manage devices in the account. In addition, the account device manager 220a may collect job data information in order to understand customer behavior with respect to the utilization of managed devices. In an embodiment, the job data information may be provided to one or more of the account services manager 210 for further processing and in turn to the account report manager 215 to generate a report based on the information.

Figure 3:
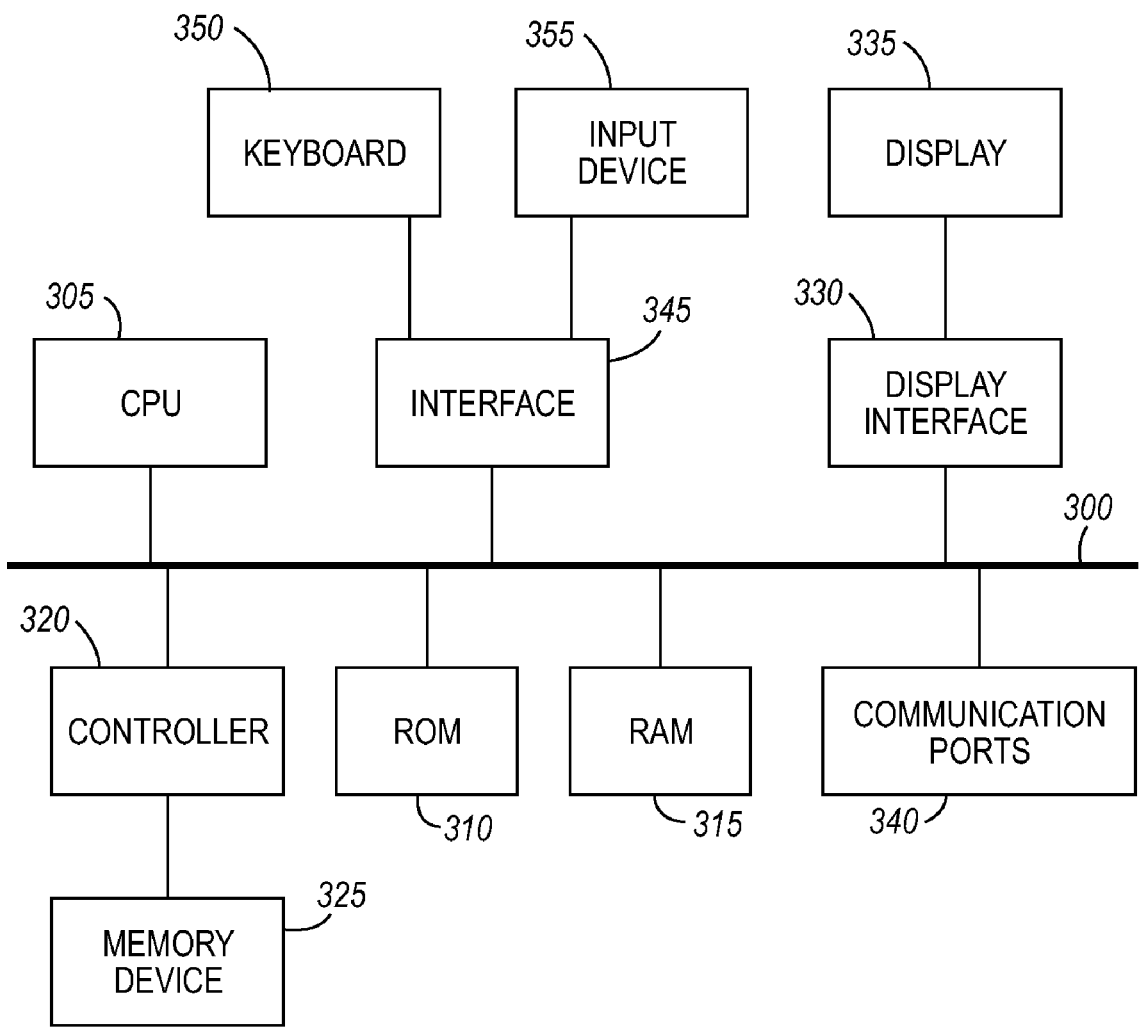
FIG. 3 depicts a block diagram of exemplary internal hardware that may be used to contain or implement program instructions according to an embodiment.

FIG. 3 depicts a block diagram of exemplary internal hardware that may be used to contain or implement program instructions according to an embodiment. A bus 300 serves as the main information highway interconnecting the other illustrated components of the hardware. CPU 305 is the central processing unit of the system, performing calculations and logic operations required to execute a program. Read only memory (ROM) 310 and random access memory (RAM) 315 constitute exemplary memory devices.

A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Program instructions may be stored in the ROM 310 and/or the RAM 315. Optionally, program instructions may be stored on a tangible computer readable storage medium such as a compact disk, a digital disk, flash memory, a memory card, a USB drive, an optical disc storage medium, such as Blu-ray™ disc, and/or other recording medium.

An optional display interface 330 may permit information from the bus 300 to be displayed on the display 335 in audio, visual, graphic or alphanumeric format. Communication with external devices may occur using various communication ports 340. An exemplary communication port 340 may be attached to a communications network, such as the Internet or an intranet.

The hardware may also include an interface 345 which allows for receipt of data from input devices such as a keyboard 350 or other input device 355 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for identifying print devices having a utilization within a utilization band, the system comprising:
a processor; and
a non-transitory processor-readable memory in operable communication with the processor, wherein the non-transitory processor-readable memory comprises one or more programming instructions for performing the following:
receiving a selection for a utilization band comprising a minimum utilization and a maximum utilization,
receiving print device information for each of a plurality of accounts, wherein the print device information for each account comprises a print device model and utilization information for each print device associated with the account,
for each print device, determining a utilization based on the utilization information,
for each print device model in each account, determining a number of print devices in the account having the print device model and for which the utilization is in the utilization band, wherein each combination of print device model and account comprises a print device model-account pair,
identifying a plurality of clusters for the print device model-account pairs by:
for each of a plurality of numbers of clusters:
determining a probability that each print device model-account pair occurs,
determining a maximum log likelihood value equal to a sum, over all print device model-account pairs, of a product of the number of print devices in a print device model-account pair having the print device model and for which the utilization is in the utilization band and the log of the probability that the print device model-account pair occurs, and
determining a penalized likelihood value based on at least the number of clusters and the maximum log likelihood value for the number of clusters, and
selecting a number of clusters from the plurality of numbers of clusters
corresponding to the smallest penalized likelihood value, and
assigning at least one print device model-account pair to a cluster.

2. The system of claim 1, wherein the one or more programming instructions for determining a utilization based on the utilization information comprises one or more programming instructions for performing the following:
determining utilization values for a print device for a plurality of time periods; and
determining a utilization for the print device based on the utilization values.

3. The system of claim 1, wherein the one or more programming instructions for determining a penalized likelihood value comprise one or more programming instructions for determining $K \log|X| - 2l_{mle}(K)$, where:
K is the number of clusters,
|X| is the sum of the number of devices in each print device model-account pair having the print device model and for which the utilization is in the utilization band, and
$l_{mle}(K)$ is the maximum log likelihood value for K clusters.

4. The system of claim 1, wherein the one or more programming instructions for determining a penalized likelihood function value comprise one or more programming instructions for determining $2K - 2l_{mle}(K)$, where:
K is the number of clusters, and
$l_{mle}(K)$ is the maximum log likelihood value for K clusters.

5. The system of claim 1, wherein the one or more programming instructions for assigning at least one print device model-account pair to a cluster comprise one or more programming instructions for performing the following:
    for at least one print device model-account pair, for each cluster, determining a probability that the print device model-account pair is associated with the cluster, and
    in response to at least one probability for the print device model-account pair surpassing a threshold value, assigning the print device model-account pair to the cluster associated with the highest probability.

6. The system of claim 1, wherein the one or more programming instructions for assigning at least one print device model-account pair to a cluster comprise one or more programming instructions for performing the following:
    for at least one print device model-account pair, for each cluster, determining a probability that the print device model-account pair is associated with the cluster, and
    assigning the print device model-account pair to the cluster associated with the highest probability.

7. The system of claim 1, wherein the processor-readable storage medium further comprises one or more programming instructions for determining a confidence value for the at least one print device model-account pair assigned to a cluster.

8. The system of claim 1, wherein the processor-readable storage medium further comprises one or more programming instructions for displaying the print device model-account pairs associated with the cluster.

9. A method of identifying devices having a utilization within a utilization band, the method comprising:
    receiving, by a processing device, a selection for a utilization band comprising a minimum utilization and a maximum utilization;
    receiving, by the processing device, device information for each of a plurality of accounts, wherein the device information for each account comprises a device model and utilization information for each device associated with the account;
    for each device model in each account, determining, via the processing device, a number of devices in the account having the device model and a utilization in the utilization band, wherein each combination of device model and account comprises a device model-account pair; and
    identifying, via the processing device, a plurality of clusters for the device model-account pairs by:
    for each of a plurality of numbers of clusters:
        determining a probability that each device model-account pair occurs,
        determining a maximum log likelihood value equal to the sum, over all device model-account pairs, of the product of the number of devices in a device model-account pair having the device model and for which the utilization is in the utilization band and the log of the probability that the device model-account pair occurs, and
        determining a penalized likelihood value based on at least the number of clusters, the maximum log likelihood value for the number of clusters, and
    selecting a number of clusters from the plurality of numbers of clusters corresponding to the smallest penalized likelihood value.

10. The method of claim 9, further comprising determining a utilization based on the utilization information, wherein determining a utilization based on the utilization information comprises:
    determining utilization values for a device for a plurality of time periods; and
    determining a utilization for the device based on the utilization values.

11. The method of claim 9, wherein determining a penalized likelihood value comprises determining $K \log|X| - 2l_{mle}(K)$, where:
    K is the number of clusters, $|X|$ is the sum of the number of devices in a device model-account pair having the device model and for which the utilization is in the utilization band, and
    $l_{mle}(K)$ is the maximum log likelihood value for K clusters.

12. The method of claim 9, wherein determining a penalized likelihood value comprises determining $2K - 2l_{mle}(K)$, where: K is the number of clusters, and $l_{mle}(K)$ is the maximum log likelihood value for K clusters.

13. The method of claim 9, further comprising assigning at least one device model-account pair to a cluster, wherein assigning at least one device model-account pair to a cluster comprises:
    for at least one device model-account pair, for each cluster, determining a probability that the device model-account pair is associated with the cluster, and
    in response to at least one probability for the device model-account pair surpassing a threshold value, assigning the device model-account pair to the cluster associated with the highest probability.

14. The method of claim 9, further comprising assigning at least one device model-account pair to a cluster, wherein assigning at least one device model-account pair to a cluster comprises:
    for at least one device model-account pair,
        for each cluster, determining a probability that the device model-account pair is associated with the cluster, and
        assigning the device model-account pair to the cluster associated with the highest probability.

15. The method of claim 9, further comprising:
    determining a confidence value for the at least one device model-account pair assigned to a cluster.

16. The method of claim 9, further comprising:
    displaying the device model-account pairs associated with at least one of the plurality of clusters.

17. A system for identifying devices having a utilization within a utilization band, the system comprising:
    a processor; and
    a non-transitory processor-readable memory in operable communication with the processor, wherein the non-transitory processor-readable memory comprises one or more programming instructions for performing the following:
        receiving a selection for a utilization band comprising a minimum utilization and a maximum utilization,
        receiving device information for each of a plurality of accounts, wherein the device information for each account comprises a device model and a utilization for each device associated with the account,
        for each device model in each account, determining a number of devices in the account having the device model and for which the utilization is in the utilization band, wherein each combination of device model and account comprises a device model-account pair,
        identifying a plurality of clusters for the device model-account pairs by:
        for each of a plurality of numbers of clusters:
            determining a probability that each device model-account pair occurs,
            determining a maximum log likelihood value equal to the sum, over all device model-account pairs, of the product of the number of devices in a device model-account pair having the device model and for which the utilization is in the utilization band and the log of the probability that the device model-account pair occurs, and determining a penalized likelihood value based on at least the number of clusters and the maximum log likelihood value for the number of clusters, and selecting a number of clusters from the plurality of numbers of clusters corresponding to the smallest penalized likelihood value, and assigning at least one device model-account pair to a cluster.

* * * * *